United States Patent Office 3,357,255
Patented Dec. 12, 1967

3,357,255
FLUID PRESSURE SYSTEM LEAK DETECTOR
Blake Reynolds, Riverside, Conn., assignor to Texaco Development Corporation, New York, N.Y., a corporation of Delaware
Filed June 29, 1965, Ser. No. 467,930
4 Claims. (Cl. 73—407)

ABSTRACT OF THE DISCLOSURE

A fluid pressure differential amplifier useful for detecting rate of change of pressure in a fluid system in which a pressure difference is applied across a pressure responsive sensing diaphragm and the force generated by the pressure difference across the sensing diaphragm is balanced against a counteracting force developed by applying a larger pressure differential across a diaphragm of smaller cross-sectional area than that of the sensing diaphragm.

---

Figure 1:
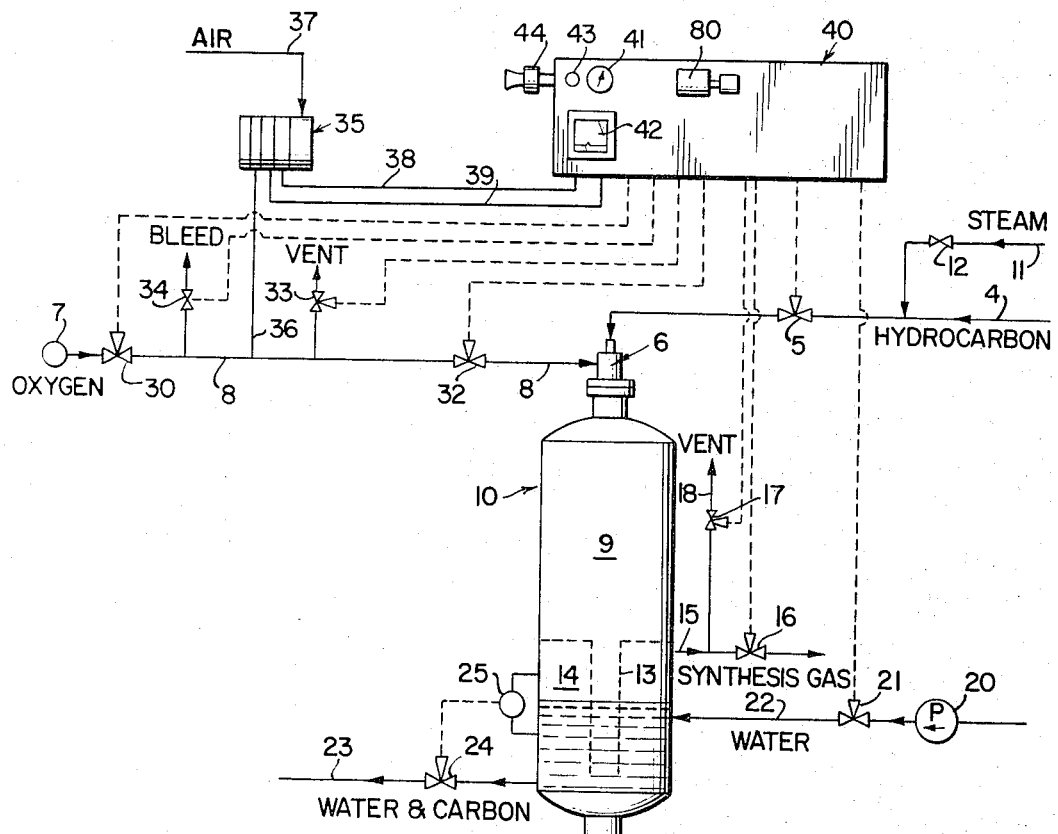

This invention relates to a fluid pressure system and to a method and apparatus comprising a fluid pressure differential amplifier for detecting rate of change of pressure. In one of its more specific aspects it relates to method and apparatus for determining gain or loss of fluid from a closed system under pressure.

The method and apparatus of this invention is particularly useful for detecting leakage in fluid supply lines under static conditions and for indicating the rate of the leakage to or from a closed system as evidenced by the rate of change of pressure in the system. Fluid gain or loss, and consequent increase or reduction of pressure, may result from leakage or from malfunction of valves or instruments. The present invention provides a method and apparatus for determining which valves or instruments in a system are causing leakage and the rate at which leakage occurs.

The invention is described herein as applied to testing for leakage the valves in the oxygen supply line to a synthesis gas generator for production of synthesis gas, i.e., a mixture of carbon monoxide and hydrogen, from hydrocarbons by partial oxidation with oxygen-containing gas. It is to be understood that both the method and apparatus described herein are useful in many other instances in which rate of change of pressure is to be determined. Various other uses of the invention will be apparent to one skilled in the art from the following description of the invention as applied to monitoring the oxygen supply line equipment in the generation of synthesis gas.

The generation of synthesis gas by partial oxidation of hydrocarbon or carbonaceous fuels to produce carbon monoxide and hydrogen is well known. In the partial oxidation process, fuel is reacted with a limited amount of oxygen under carefully controlled conditions to produce carbon monoxide and hydrogen as the primary products of reaction. Small amounts of carbon dioxide and solid carbon are produced in the reaction. Steam generally is added to the fuel or oxygen supplied to the reaction zone to control the reaction temperature and to produce additional hydrogen by reaction with hydrocarbons and with carbon monoxide. Alternatively or in addition to steam, carbon dioxide may be included in the reactants supplied to the gas generator. Air or oxygen-enriched air may be used in the partial oxidation reaction depending upon the final use of the product gas. Generally it is preferable to use commercially pure oxygen, i.e., an oxygen-rich fraction obtained by liquefaction and rectification of air, and containing in excess of about 95 percent oxygen by volume.

The dangers involved in handling substantially pure oxygen, particularly in an environment in which leakage of valves or equipment may permit oxygen to come into contact with combustible gases at relatively high temperatures are well known. Generally the design of the synthesis gas generation equipment precludes the formation of combustible mixtures except at the burner. When the gas generator is in a standby or shutdown condition, leakage of combustible gases from the generator into the oxygen supply line must be avoided. At the same time, the condition of the valves is determined by tests or inspection.

It is an object of this invention to provide a method and apparatus for determining rate of change of pressure. It is another object of this invention to provide a method and apparatus which is useful for determining leakage of fluid to or from a closed system, e.g. the supply line to a reactor such as the oxygen supply line to a synthesis gas generator.

The apparatus of this invention makes possible rapid checking of the valves and associated equipment for leakage by determining the response of a pressure sensitive element to pressure differences produced in the apparatus by reason of change of pressure in the system under observation. The pressure difference is amplified by the apparatus of this invention and the amplified pressure difference utilized to actuate an indicator or an alarm system. The testing operation or checking of the condition of the equipment may be initiated and carried out manually or automatically at predetermined intervals. In synthesis gas generation, the checking is carried out only while the reactor is in standby or shutdown condition. It will be understood that a programmed set of tests may be applied automatically to check the function of several instruments or valves in sequence or to check any one of them under one or more different conditions. The results of the tests may be recorded automatically. Programmed sequences of valve operations and automatic recording of pressures and pressure differences are well known and the apparatus, per se, employed for these functions is not part of the present invention. It is desirable when an abnormal condition is detected that the condition be indicated by sounding an alarm and that a permanent record of the test be provided, call to the operator's attention the existence of the abnormal condition and assist him in determining which of the valves or instruments in the system is responsible for such conditions.

In the following detailed description of the invention a suitable device is shown for checking the valves in an oxygen supply line to a synthesis gas generation system for leakage. To simplify the description, many of the valves and instruments have been omitted from the drawing and description.

In the normal operation of a synthesis gas generator as illustrated in the drawings, oxygen and hydrocarbon fuel, optionally mixed with steam, are supplied to a combustion zone or reaction chamber where partial oxidation of the fuel to carbon monoxide and hydrogen takes place. The product gas is quench cooled with water and delivered to a subsequent process step. When it is desired to shut down the gas generator, the flow of oxygen to the generator is stopped first. Immediately thereafter the flow of hydrocarbon fuel is stopped and the product gas outlet line closed. When steam is used also as a reactant feed, the flow of steam is continued and the generator product gas outlet vented under back pressure control to maintain the generator pressure after both the oxygen flow and the hydrocarbon flow have stopped until such time as the operator depressures the generator by venting it to atmosphere. The supply of cooling water to the gas generator is maintained to prevent overheating as a result of residual heat contained in the reactor. Cooling water is permitted to circulate until a safe temperature level is reached at which time it too may be discontinued. It will be evident that leakage of the oxygen supply valve during the period immediately following shutdown could result in a dangerous condition, particularly if the oxygen comes into contact with hydrogen and carbon monoxide in one of the feed stream transfer lines. A dangerous condition could exit also if oxygen leakage occurs during the start up prior to the time flow to the generator is normally established.

The method and apparatus of my invention and its application to a specific example in which synthesis gas is generated by partial oxidation of a hydrocarbon is illustrated in the accompanying drawing and described in detail hereinafter.

FIG. 1 of the drawing is a diagrammatic illustration of a synthesis gas generator showing the various control valves in the oxygen supply line and an exemplary application of the apparatus of this invention.

Figure 2:
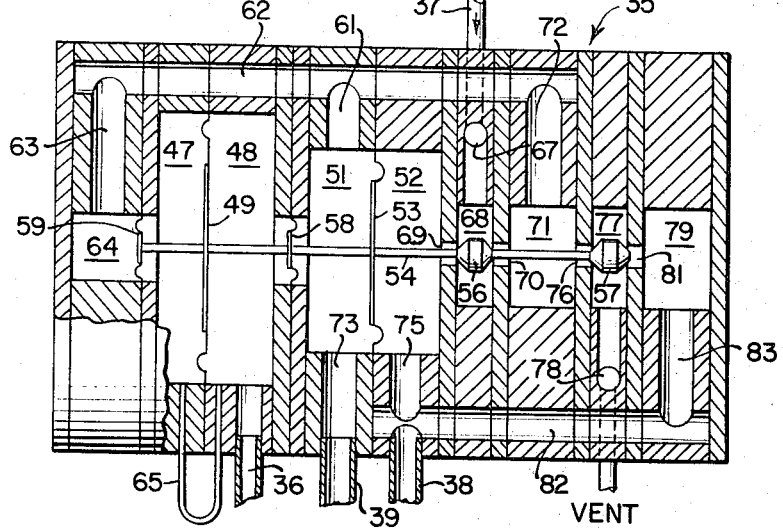

FIG. 2 is a cross-sectional view, somewhat diagrammatic, of apparatus suitable for carrying out the present invention.

With reference to the drawing, hydrocarbon fuel from a suitable source of supply is introduced through line 4 and control valve 5 to burner 6. At the burner, the hydrocarbon fuel is mixed with oxygen from a supply header 7 introduced to the burner through line 8 and the mixture is fed into the reaction zone section 9 of synthesis gas generator 10. The hydrocarbon fuel may comprise natural gas, vaporized liquid hydrocarbon, or fuel oil dispersed in steam supplied through line 11 and control valve 12. The fuel is preheated to the desired extent, for example, 600 to 800° F. for liquid hydrocarbons and 600 to 1200° F. for gaseous fuels. Optionally, steam may be mixed with the oxygen although it is usually preferable, when steam is employed, to supply the steam with the hydrocarbon fuel. The steam and fuel may be mixed and the mixture of steam and oil vapor, or fuel oil in fine particle form dispersed in steam, supplied to the burner. Alternatively, the steam and fuel may be separately supplied to the burner and mixed at the burner. Ordinarily oxygen may be supplied to the burner at a temperature in the range 200 to 300° F., the temperature developed on compression of the oxygen, but it may be preheated to a higher temperature, usually not over 600° F.

The synthesis gas generator preferably is operated at an elevated pressure above 100 pounds per square inch gauge and desirably at a pressure of 500 pounds per square inch gauge or higher. Pressures in the range of 1000 to 3000 pounds per square inch gauge are desirable where the gas is to be used in high pressure processes, e.g. hydrogenation or ammonia synthesis.

The hydrocarbon fuel and oxygen, optionally with added steam, react in the upper part of the refractory lined cylindrical pressure vessel 10 comprising the synthesis gas generator at an autogenous temperature above about 2200° F., usually at a preferred temperature in the region of 2600° F., to produce synthesis gas comprising carbon monoxide and hydrogen as the principal products of reaction. Suitable apparatus is described in U.S. Patent 2,818,326. The hot synthesis gas also contains entrained carbon which may range from a trace amount to about 2 to 3 percent of the carbon content of the fuel supplied to the burner of the gas generator. With gaseous fuels, the production of carbon is very low whereas with heavy fuel oils the product carbon often amounts to as much as 2 to 3 percent of the carbon content of the fuel.

Hot synthesis gas produced in the reaction zone in the upper part of gas generator 10 is discharged through a dip tube 13 into quench chamber 14 into direct, intimate contact with water contained in the quench chamber. A preferred form of quench apparatus is described in U.S. Patent 2,896,927. The hot gaseous reaction products are quickly cooled upon contact with the water in the quench zone 14 and at the same time a large part of the entrained carbon from the freshly generated synthesis gas is trapped by the water to form a carbon-water slurry. Heat from the hot synthesis gas vaporizes a substantial amount of water to steam which mixes with the carbon monoxide and hydrogen and is useful in subsequent operations, for example, in the water gas shift reaction (not illustrated) in which steam reacts with carbon monoxide in the presence of a metal oxide catalyst to produce hydrogen and carbon dioxide.

Cooled synthesis gas is discharged through line 15 and valve 16 as product gas for further processing. Alternatively, the hot gaseous products of reaction may be cooled by indirect heat exchange with water to produce steam, for example, in a waste heat boiler (not illustrated in the drawing), or by a combination of direct water quench and indirect heat exchange. Gas may be vented from the synthesis gas generator through valve 17 to a vent line 18 to depressure the apparatus when the unit is shut down and during the startup procedure. Water is supplied to quench zone 14 as required by pump 20 through a control valve 21 and line 22. A carbon-water slurry is normally discharged from quench zone 14 through line 23 as controlled by valve 24, suitably in response to a liquid level control 25.

Accumulations of solid material, for example, scale or heavy solid particles from the fuel, may be withdrawn periodically from the lowermost portion of the quench zone through line 26 controlled by valve 27.

Having described the general process of synthesis gas generation by the partial oxidation reaction, the present invention is hereinafter more fully described as applied to the oxygen supply portion of the apparatus for carrying out the process.

Oxygen from supply header 7 is admitted to line 8 at a rate controlled by flow control valve 30 in proportion to the rate at which hydrocarbon fuel is supplied to the generator through line 4 and valve 5. A shut-off valve 32, preferably actuated automatically in case of power failure or other emergency, permits almost instantaneous shutoff of oxygen flow. Valve 33 permits venting oxygen from line 8 during the startup and for switching of the oxygen flow from the vent line to the generator during start-up operations. Valve 34, a small bleed valve, permits the release of oxygen from line 8 for testing of the various valves 30, 32, and 33 as explained hereinafter. In normal operation, valve 32 is open, valve 33 is closed, and the flow of oxygen to the generator is controlled by valve 30. On shutdown, valves 30 and 32 are closed, but valve 33 does not change position. Valve 30 is intended to seal tightly against the pressure in oxygen supply header 7 and valve 32 is intended to seal tightly against pressure in either direction.

Detector 35 is a rate of pressure change detector and transmitter which detects leakage of the valves in the oxygen line when the generator is shutdown by closing valves 30 and 32 as evidenced by change of pressure in line 8 resulting from such leakage. The pressure in line 8 between valves 30 and 32 is transmitted to detector 35 through line 36. Air under pressure, suitably from the plant instrument air supply, is supplied to the detector through line 37. Detector 35 transmits air pressure through lines 38 and 39 to control panel 40 in response to changes in pressure in the segment of line 8 to which detector 35 is attached. Changes in pressure are indicated on indicator 41 and recorded by recorder 42. If desired, the pressure difference transmitted through lines 38 and 39 may be used to actuate an alarm system, suitably by control of a pressure responsive electric switch to energize light 43 or horn 44.

With reference to FIG. 2, the detector and transmitter 35 is shown in detail. This device is essentially a rate of pressure change detector and a pressure differential amplifier. The instrument comprises a plurality of disks clamped together to form a closed cylindrical unit enclosing cylindrical chambers 47 and 48 separated by pressure responsive diaphragm 49 and chambers 51 and 52 separated by pressure responsive diaphragm 53. Diaphragms 49 and 53 are of generally circular configuration and are attached to valve stem 54 operatively connected to double faced, balanced valves 56 and 57. A similar but smaller diaphragm 58 is provided as a seal to prevent leakage between chambers 48 and 51 without the necessity for packing. A balancing diaphragm 59 equal in area to diaphragm 58 opposes the action of diaphragm 58 to avoid any displacement of valve stem 54 due to pressure differences across seal diaphragm 58. The pressure in chamber 51 is transmitted through passageways 61, 62, and 63 to chamber 64 exerting a force on diaphragm 59 and valve stem 54 equal and opposite the force exerted on the valve stem by diaphragm 58. Diaphragm 53 is smaller than diaphragm 49 so that the pressure difference between chambers 51 and 52 necessary to balance the forces on valve stem 54 is greater than the pressure difference between chambers 47 and 48. The result is that any pressure difference between chambers 47 and 48 is amplified by the detector so that the pressure difference transmitted to control panel 40 through lines 38 and 39 is greater than that between chambers 47 and 48.

Although the detailed description herein of a preferred specific embodiment of apparatus of my invention illustrates and describes the apparatus with reference to pressure responsive diaphragms, it will be evident that other equivalent known pressure responsive means may be used.

A capillary tube 65 permits fluid to flow from chamber 47 to 48, or vice versa, the purpose of which will be described in more detail hereinafter. It will be evident that the capillary tube is a form of orifice or valve and that a suitable valve, for example, a needle valve, or an orifice may be employed instead of the capillary tube illustrated.

Air under pressure is admitted through line 37 and inlet 67 to valve chamber 68 of double acting valve 56. Depending upon the position of valve stem 54, more or less air may be permitted to pass from chamber 68 through port 69 into chamber 52 or through port 70 to chamber 71. From chamber 71, the air may pass through passageways 72, 62 and 61 into chamber 51. From chamber 51, air may be delivered to line 39 through passageway 73 to transmit pressure to control panel 40. Air passing through port 69 into chamber 52 is delivered through passageway 75 to line 38 to transmit pressure to control panel 42. Air may be vented from chamber 71 through port 76 to chamber 77 which is vented to the atmosphere through vent 78. Venting of chamber 71 permits air to escape from chamber 51 through passageways 61, 62 and 72 to reduce the pressure in chamber 51. Similarly, air may be vented from chamber 79 to the atmosphere through port 81, which in turn, permits air to escape from chamber 52 through passageways 75, 82 and 83. It will be evident that when the valve stem 54 is moved to the right in the illustration of FIG. 2, valves 56 and 57 will restrict the flow of air through ports 70 and 81 respectively and permit more air to flow through ports 69 and 76 respectively. Thus air from line 37 is supplied through port 69 to chamber 52 while air from chamber 51 is permitted to flow through the connecting passageways 61, 62 and 72 to chamber 71 and to escape through port 76, valve chamber 77 and vent 78 to the atmosphere. Conversely, when the valve stem 54 is pressed to the left in the illustration of FIG. 2, ports 69 and 76 are restricted and ports 70 and 81 are opened so that air from line 37 is admitted to chamber 51 via valve chamber 71, and passageways 72, 62 and 61 at a rate faster than it can escape through port 76 increasing the pressure in chamber 51, while air from chamber 52 is vented to the atmosphere through passageways 75, 82, and 83, chamber 79 and port 81 at a rate faster than the rate at which air is admitted to chamber 52 through port 69. A balance or null will be reached when the differential pressure between chambers 51 and 52 acting on diaphragm 53 is just sufficient to balance the pressure differential between chambers 47 and 48 acting on diaphragm 49. By making diaphragm 53 smaller than diaphragm 49, the pressure difference between chambers 51 and 52 must be larger than the pressure difference between chambers 47 and 48. If, for example, diaphragm 53 is one half the diameter of diaphragm 49, the differential pressure between chambers 51 and 52, transmitted to the control panel, will be approximately four times the differential pressure between chambers 47 and 48. Thus, the pressure difference can be amplified to any desired extent, depending upon the choice of diaphragms. The difference in pressure between chambers 51 and 52 is transmitted by lines 38 and 39 to indicator 41 and recorder 42 on control panel 40.

When the pressure in line 8 decreases, the pressure in chamber 48 will be lower than the pressure in chamber 47 and fluid, for example oxygen will flow from chamber 47 to chamber 48 through capillary tube 65. The rate of pressure decline in line 8 will be evidenced by the pressure difference between chambers 47 and 48 and, in turn, by the pressure difference between chambers 51 and 52 necessary to balance the pressure difference between chambers 47 and 48, and the pressure in chamber 51 will be lower than the pressure in chamber 52. The capillary tube 65 restricts the flow of gas between chambers 47 and 48 so that during a period of pressure decline in line 8, and in chamber 48, a pressure difference exists across diaphragm 49 and also across diaphragm 53. The latter pressure difference is transmitted through lines 38 and 39 to control panel 40. During a pressure rise in line 8, the pressure in chamber 48 will be higher than that in chamber 47 and gas will flow through capillary tube 65 from chamber 48 to chamber 47. At the same time, the pressure difference will be reflected by a corresponding but large pressure difference between chambers 51 and 52 and by indicators on control panel 40. During static periods when there is no pressure change in line 8, the pressure in chambers 47 and 48 is equalized by flow of gas through capillary tube 65 and no pressure difference will exist between chambers 51 and 52.

Detector 35 is useful for determining the condition of valves in line 8 since leakage of a closed valve during a shutdown period will result in a pressure change in line 8 which is detected by detector 35. For example, immediately upon shutting down the gas generator by closing valve 30, 32 and 16 the pressures in the various parts of the system may be as follows:

| | P.s.i.g. |
|---|---|
| Oxygen header 7 | 600 |
| Line 8 | 600 |
| Gas generator 10 | 550 |
| | 500 |

Leakage of valve 30 from oxygen header 7 will be indicated by an increase in pressure in line 8 whereas leakage of valve 32 will be indicated as a pressure decline in line 8. The pressure change is detected by detector 35 and transmitted to the instruments on control panel 40. If the rate of pressure change is above a predetermined value requiring immediate attention by the operator, warning light 43 or horn 44, or both, may be actuated to call this abnormal condition to the attention of the operator so that remedial action may be taken. After the first check has been made, designated "Test 1" in the following table, other tests may be made by opening and closing various valves in sequence and either applying pressure to line 8 from oxygen header 7 by opening valve 30 or by reducing pressure to any desired extent by bleeding gas from line 8 through valve 34 which is used only for releasing gas from line 8 for test purposes. The following table illustrates a number of tests which may be made to determine the conditions of valves 30, 32 and 33. Illustrative pressures are shown based upon an oxygen supply pressure of 600 p.s.i.g. and a normal gas generator operating pressure of 500 p.s.i.g.

| Part of Cycle | Valve Positions and Pressures ||||||||| 
|---|---|---|---|---|---|---|---|---|---|
| | Oxygen Line ||||| Fuel Valve No. 5 | Generator |||
| | Valve No. |||| Pres. | | Valve No. || Pres. |
| | 30 | 33 | 32 | 34 | | | 16 | 17 | |
| Start-up | O | O | C | C | ------ | O | C | O | Atm. |
| Run | O | C | O | C | 550 | O | C | C* | 500 |
| Shut-down | C | C | C | C | 550 | C | C | C* | 500 |
| Test 1 | C | C | C | C | 600 | C | C | C* | 500 |
| Test 2 | O-C | C | C | C | 500 | C | C | C* | 500 |
| Test 3 | C | C | C | O-C | Atm. | C | C | C* | 500 |
| Test 4 | C | C | O | C | | C | C | C* | 500 |

O=open. C=closed.
C*=set to maintain desired pressure.
O-C=open to reduce pressure, then closed for test.
Test 1—Tests valves 30, 32 and 33.
Test 2—Tests valve 32 in normal direction of flow.
Test 3—Tests valve 30.
Test 4—Tests valve 32 in reverse direction.

The above table indicates the positions of the various valves in the system during the start-up period, during the run or normal operation of the synthesis gas generator, and during the shutdown of the gas generator. The sequence of pressure changes and valve positions shown in the table illustrates tests of the various valves as indicated in the footnotes to the table. The sequence may be controlled manually or by a sequence timer 80 at control panel 40 as desired. Sequence timers are well known in the art and form no part of the present invention, per se. The sequence timer provides automatic checking of the valves while recorder 42 provides a permanent record of the tests.

Having described my invention in detail hereinabove in an illustrative application, the scope of my invention is to be determined by the appended claims.

I claim:
1. In a fluid pressure system, a fluid pressure differential amplified which comprises:
   (a) a first pressure responsive diaphragm,
   (b) means for applying a pressure difference across said diphragm,
   (c) a second pressure responsive diaphragm of smaller area than said first pressure responsive diaphragm,
   (d) rigid connecting means between said pressure responsive diaphragms,
   (e) a source of fluid under pressure, and
   (f) means for supplying said fluid under pressure preferentially to either side of said second pressure responsive diaphragm and for releasing fluid under pressure preferentially from the opposite side thereof in response to movement of said diaphragms to counterbalance and nullify response by said first diaphragm to said pressure difference.

2. An apparatus according to claim 1 wherein said means for supplying and releasing fluid comprises a pair of double acting balanced valves operatively connected by a valve stem to said pressure responsive diaphragms to admit fluid under pressure preferentially to one side of said second pressure responsive diaphragm and simultaneously release fluid under pressure preferentially from the opposite side thereof when moved in one direction by said valve stem and to reverse the procedure when moved in the opposite direction as a result of inbalance of opposing differential pressures acting upon said pressure responsive diaphragms, said supply and release of fluid acting to apply a pressure differential across said second diaphragm in an opposite direction to said movement of said valve stem.

3. Apparatus for use in a fluid flow control system under pressure employing a plurality of valves in a fluid flow line comprising:
   (a) means for isolating a portion of said flow line comprising at least two of said valves,
   (b) a first pressure responsive means comprising a diaphragm with one side in communication with said isolated portion of said flow line,
   (c) a closed chamber of relatively small volume in communication with the opposite side of said diaphragm of said pressure responsive means,
   (d) a bleed means for permitting passage of fluid from said one side of said diaphragm to or from said closed chamber at a restricted rate in response to pressure changes in said isolated portion of said flow line,
   (e) a second pressure responsive means comprising a second diaphram of smaller diameter than said first diaphragm,
   (f) a pair of double acting valve means to admit fluid under pressure selectively to either side of said diaphragm of said second pressure responsive means and to selectively vent fluid from the opposite side thereof,
   (g) means comprising a valve stem connecting said first pressure responsive diaphragm to said second diaphragm and to said valve means,
   (h) said first pressure responsive means comprising balanced sealing means between said second pressure responsive means and said first pressure responsive means,
   (i) said second pressure responsive means comprising a diaphragm divided chamber structure wherein portions of said chamber on opposite sides of said diaphragm are in communication with said valve means to admit fluid to enter and leave said chamber portions in response to movement of said diaphragms and said valve stem to counterbalance and nullify response by said first pressure responsive means to a change of pressure in said flow line by setting up a balancing opposing pressure difference across said diaphragm in said second pressure responsive means.

4. A pressure amplifying device for detecting and amplifying a change in fluid pressure which comprises:
   (a) a housing having a partition therein defining two main chambers, (b) a first pressure responsive diaphragm in one of said main chambers defining a closed reference chamber and a pressure sensing chamber,
(c) a second pressure responsive diaphragm of smaller area than said first in the other of said main chambers defining two fluid pressure chambers,
(d) a valve stem extending through said chambers and through said partition and secured to said diaphragms,
(e) a seal diaphragm between said partition and said valve stem forming a fluid tight seal between said pressure sensing chamber and a first one of said fluid pressure chambers,
(f) a balancing chamber in said housing having a balancing diaphragm of the same area as said seal diaphragm attached to said valve stem and responsive to pressure difference between said reference chamber, and said balancing chamber,
(g) means for transmitting fluid pressure from said first pressure chamber to said balancing chamber on the opposite side of said balancing diaphragm from said reference chamber,
(h) a source of fluid under pressure,
(i) balanced valve means connected to said valve stem to preferentially admit fluid under pressure from said source to one of said pressure chambers and simultaneously preferentially vent fluid under pressure from the other of said pressure chambers upon movement of said valve stem by inbalance of fluid pressures acting on said diaphragms and for controlling the flow preferentially in reverse manner upon movement of said valve stem in the opposite direction.

References Cited

UNITED STATES PATENTS 2,176,807  10/1939  Wunsch _____ 73—179 X
3,083,696   4/1963  Mikulski et al. ____ 137—85 X LOUIS R. PRINCE, *Primary Examiner.*

J. NOLTON, *Assistant Examiner.*